US011075895B2

(12) United States Patent
Yang et al.

(10) Patent No.: US 11,075,895 B2
(45) Date of Patent: Jul. 27, 2021

(54) CLOUD OPERATION INTERFACE SHARING METHOD, RELATED DEVICE, AND SYSTEM

(71) Applicant: HUAWEI TECHNOLOGIES CO., LTD., Guangdong (CN)

(72) Inventors: Fen Yang, Nanjing (CN); Mingxing Cai, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 201 days.

(21) Appl. No.: 16/066,408

(22) PCT Filed: Dec. 31, 2015

(86) PCT No.: PCT/CN2015/100262
§ 371 (c)(1),
(2) Date: Jun. 27, 2018

(87) PCT Pub. No.: WO2017/113359
PCT Pub. Date: Jul. 6, 2017

(65) Prior Publication Data
US 2019/0020640 A1 Jan. 17, 2019

(51) Int. Cl.
*H04L 29/06* (2006.01)
*H04L 29/08* (2006.01)
(Continued)

(52) U.S. Cl.
CPC .............. *H04L 63/08* (2013.01); *H04L 29/08* (2013.01); *H04L 67/10* (2013.01); *H04W 76/10* (2018.02); *H04W 88/04* (2013.01)

(58) Field of Classification Search
CPC ......... H04L 63/08; H04L 67/10; H04L 29/08; H04W 76/10; H04W 88/04
See application file for complete search history.

(56) References Cited

U.S. PATENT DOCUMENTS 8,701,174 B1 4/2014 Dotan
2014/0006772 A1* 1/2014 Qureshi ................ H04L 9/0891
713/150
(Continued)

FOREIGN PATENT DOCUMENTS

CN 101783834 A 7/2010
CN 102075546 A 5/2011
(Continued)

OTHER PUBLICATIONS

International Search Report and Written Opinion issued in International Application No. PCT/CN2015/100262 dated Sep. 29, 2016, 13 pages.
(Continued)

*Primary Examiner* — Noura Zoubair
(74) *Attorney, Agent, or Firm* — Fish & Richardson P.C.

(57) ABSTRACT

A cloud operation interface sharing method, a related device includes: displaying, by a first terminal device, a first message sent by a cloud operating system of a second terminal device, where the first message carries first authentication information and address information of the cloud operating system, and the first message informs the first terminal device that the second terminal device authorizes the first terminal device to use the cloud operating system; requesting, by the first terminal device, authentication from the cloud operating system; after the authentication succeeds, establishing, by the first terminal device, a connection to the cloud operating system; receiving, by the first terminal device, interface information sent by the cloud operating system; and switching, by the first terminal device, a currently displayed first operation interface to a second operation interface corresponding to the interface information.

19 Claims, 10 Drawing Sheets

(51) Int. Cl.
*H04W 76/10* (2018.01)
*H04W 88/04* (2009.01)

(56) References Cited

U.S. PATENT DOCUMENTS

| | | |
|---|---|---|
| 2014/0101434 A1 | 4/2014 | Senthurpandi et al. |
| 2014/0250170 A1* | 9/2014 | Duggal .................. G06F 9/468 |
| | | 709/203 |
| 2016/0127447 A1* | 5/2016 | Jiang ....................... H04L 67/06 |
| | | 709/203 |
| 2017/0085499 A1 | 3/2017 | Hou et al. |

FOREIGN PATENT DOCUMENTS

| | | |
|---|---|---|
| CN | 102148870 A | 8/2011 |
| CN | 103139183 A | 6/2013 |
| CN | 103475726 A | 12/2013 |
| CN | 103595759 A | 2/2014 |
| CN | 104636678 A | 5/2015 |
| CN | 105162668 A | 12/2015 |
| KR | 101232790 B1 | 3/2013 |

OTHER PUBLICATIONS

Office Action issued in Chinese Application No. 201580050029.3 dated Apr. 29, 2019, 8 pages.
Extended European Search Report issued in European Application No. 15911984.1 dated Oct. 30, 2018, 11 pages.

* cited by examiner

CLOUD OPERATION INTERFACE SHARING METHOD, RELATED DEVICE, AND SYSTEM

CROSS-REFERENCE TO RELATED APPLICATIONS

This application is a National Stage of International Application No. PCT/CN2015/100262, filed on Dec. 31, 2015, which is hereby incorporated by reference in its entirety.

TECHNICAL FIELD

The present invention relates to the field of wireless communications technologies, and in particular, to a cloud operation interface sharing method, a related device, and a system.

BACKGROUND

When only a simple operating system is installed on a terminal device, because of higher customization and fashion requirements, the terminal device usually needs to use a complete operating system. The complete operating system (that is, a cloud operating system) is placed on a cloud server. When the cloud operating system needs to be used, an authentication request goes to the cloud server. After the authentication succeeds, a corresponding cloud operating system can be loaded. Correspondingly, operation data that is generated during use of the cloud operating system is all stored in the cloud server. When a terminal device that does not have a complete operating system installed therein needs to use a complete operating system, a system sharing manner is usually used. For example, a cloud operating system is customized for a terminal device A, and a cloud operating system is not customized for a terminal device B or a corresponding cloud operating system cannot be used. When the terminal device B needs to use a complete operating system, the terminal device A may lend the cloud operating system of the terminal device A to the terminal device B for use. However, the terminal device A has to log off from the cloud operating system, affecting user experience. In addition, the terminal device B can view operation data of the terminal device A, and there are risks in information security.

In the existing mechanism, although it is implemented that one application on a cloud operating system is simultaneously run on multiple terminal devices, due to permission granted after payment, a quantity of terminal devices that simultaneously run the application is limited. In addition, each terminal device has to download an application before normally using the application, and consequently using the application may generate a fee.

SUMMARY

This application provides a cloud operation interface sharing method, a related device, and a system, to resolve a prior-art problem that when a system is shared, security is low and an additional fee is easily generated.

A first aspect of this application provides a cloud operation interface sharing method, and the method includes:

receiving and displaying, by a first terminal device, a first message sent by a cloud operating system of a second terminal device, where the first message carries first authentication information and address information of the cloud operating system, and the first message is used to prompt the first terminal device that the second mobile terminal authorizes the first mobile terminal to use the cloud operating system;

requesting, by the first terminal device by using the first authentication information, authentication from the cloud operating system;

after the authentication succeeds, establishing, by the first terminal device, a connection to the cloud operating system by using the address information;

after the first terminal device is connected to the cloud operating system, receiving, by the first terminal device, interface information sent by the cloud operating system; and switching, by the first terminal device, a currently displayed first operation interface to a second operation interface corresponding to the interface information.

In some possible designs, the method further includes:

detecting, by the first terminal device, a first input of a user on a first application icon on the second operation interface;

sending, by the first terminal device, an operation instruction for the first application icon to the cloud operating system in response to the detected first input, so that the cloud operating system performs an operation corresponding to the operation instruction, and stores operation data generated by the operation in a file directory of the first terminal device, where the file directory of the first terminal device is a file directory generated for the first terminal device after the cloud operating system has authenticated the first terminal device; and receiving and displaying, by the first terminal device, an operation interface that is sent by the cloud operating system and that corresponds to the first application icon. An application on a shared second operation interface can be operated without being downloaded. A usage fee can be reduced, or traffic consumption can be reduced.

In some possible designs, when the interface information includes at least one application icon, the second operation interface is an operation interface that includes the at least one application icon. Some applications in a shared cloud operating system can be used without being downloaded.

In some possible designs, when the interface information includes entry information corresponding to the cloud operating system, the second operation interface is an operation interface corresponding to the cloud operating system. A cloud operating system can be shared without being downloaded.

In some possible designs, the method further includes:

detecting, by the first terminal device, second authentication information entered by the user, and sending the second authentication information to the cloud operating system; and after authentication succeeds, accessing, by the first terminal device, the file directory of the first terminal device. Because authentication is configured, a terminal device can independently access a file directory of the terminal device, thereby improving security of the file directory.

In some possible designs, the file directory of the first terminal device and a file directory of the second terminal device are independent of each other. File directories of terminal devices that use a same cloud operating system are independent of each other, information security is improved to some extent, and user information leakage risks are reduced.

In some possible designs, the file directory of the first terminal device is used to store usage data that is generated by the first terminal device when the first terminal device uses the cloud operating system. Usage data generated by the terminal devices that use the same cloud operating system is separately stored, so that it is convenient for a user to view usage data of the user.

In some possible designs, there is at least one first terminal device. Multiple terminal devices may simultaneously use the cloud operating system or some applications in the cloud operating system, and do not conflict with each other. In addition, a large quantity of terminal devices can simultaneously perform access, and a terminal device that has been authorized does not need to log off.

In some possible designs, the method further includes:

disconnecting, by the first terminal device, from the cloud operating system, and returning to the first operation interface.

In some designs, the disconnecting, by the first terminal device, from the cloud operating system is implemented in one of the following manners:

requesting, by the first terminal device, the cloud operating system to cancel the connection to the cloud operating system; and disconnecting, by the first terminal device, from a network; or receiving, by the first terminal device, a second message sent by the cloud operating system, where the second message is used to prompt the first terminal device that the second mobile terminal cancels the authorization obtained by the first mobile terminal to use the cloud operating system. The sharing mechanism is further optimized and is applicable to a case that the first terminal device temporarily performs usage.

In some designs, the disconnecting, by the first terminal device, from the cloud operating system includes:

when the first terminal device receives the second message sent by the cloud operating system, disconnecting, by the first terminal device, from the cloud operating system; or after the first terminal device receives the second message sent by the cloud operating system, disconnecting, by the first terminal device, from the cloud operating system within preset duration.

In some designs, the first operation interface includes one of the following:

an operation interface corresponding to an operating system pre-installed on the first terminal device, an operation interface corresponding to the cloud operating system of the first terminal device, an operation interface corresponding to a cloud operating system shared by terminal devices except the first terminal device, or an operation interface corresponding to some applications in a cloud operating system shared by terminal devices except the first terminal device.

In some possible designs, the first authentication information includes third authentication information that is used to authenticate whether an identity of the first terminal device is valid, and fourth authentication information that is used to verify whether the first terminal device is authorized by the second terminal device to use the remote operating system.

In some designs, the third authentication information satisfies one of the following:

being valid within preset duration, a quantity of times of usage being limited, or a quantity of times of usage or a quantity of times the cloud operating system is used being limited within preset duration. Validity duration of the first authentication information, a quantity of times of usage, and a quantity of times the cloud operating system has been used are set, so that the second terminal device flexibly controls a time during which the first terminal device is authorized to use the cloud operating system.

A second aspect of this application provides a cloud operation interface sharing method, and the method includes:

receiving, by a cloud operating system of a second terminal device, an authorization instruction sent by the second terminal device, and generating a first message by using the authorization instruction, where the first message carries first authentication information and address information of the cloud operating system;

sending, by the cloud operating system, the first message to a first terminal device, where the first message is used to prompt the first terminal device that the second mobile terminal authorizes the first mobile terminal to use the cloud operating system, where the first authentication information is used by the first terminal device to request authentication from the cloud operating system when the first terminal device requests to use the cloud operating system; and the address information is used by the first terminal device to establish a connection to the cloud operating system after the first terminal device has been authenticated;

receiving, by the cloud operating system, the first authentication information sent by the first terminal device, performing authentication on the first authentication information, and after the authentication succeeds, establishing the connection to the first terminal device; and sending, by the cloud operating system, interface information to the first terminal device, where the interface information is used by the first terminal device to switch a currently displayed first operation interface to a second operation interface corresponding to the interface information.

In some possible designs, after the cloud operating system has authenticated the first terminal device, the method further includes:

generating, by the cloud operating system, a file directory of the first terminal device, where the file directory of the first terminal device is used to store usage data that is generated by the first terminal device when the first terminal device uses the cloud operating system. Separate file directories are separately generated for terminal devices that use a same cloud operating system, and usage data generated by the terminal devices is separately stored, so that it is convenient for a user to view usage data of the user, and user data leakage risks are reduced.

In some possible designs, the method further includes:

receiving, by the cloud operating system, an operation instruction sent by the first terminal device, where the operation instruction is a first input of a user on a first application icon on the second operation interface;

performing, by the cloud operating system, an operation corresponding to the operation instruction, and storing operation data generated by the operation in the file directory of the first terminal device; and sending, by the cloud operating system, an operation interface corresponding to the first application icon to the first terminal device. An application on a shared second operation interface can be operated without being downloaded, and traffic consumption and a usage fee can be reduced.

In some possible designs, when the interface information includes at least one application icon, the second operation interface is an operation interface that includes the at least one application icon. An application on a shared second operation interface can be operated without being downloaded. A usage fee can be reduced, and traffic consumption can also be reduced.

In some possible designs, when the interface information includes entry information corresponding to the cloud operating system, the second operation interface is an operation interface corresponding to the cloud operating system. Some applications in a shared cloud operating system can be used without being downloaded.

In some possible designs, the method further includes:

receiving, by the cloud operating system, second authentication information sent by the first terminal device, and performing authentication on the first terminal device, where the second authentication information is used by the first terminal device to access the file directory of the first terminal device. Because authentication is configured, a terminal device can independently access a file directory of the terminal device, thereby improving security of the file directory.

In some possible designs, the file directory of the first terminal device and a file directory of the second terminal device are independent of each other. File directories of terminal devices that use a same cloud operating system are independent of each other, information security is improved to some extent, and user information leakage risks are reduced.

In some possible designs, there is at least one first terminal device. Multiple terminal devices simultaneously use the same cloud operating system, and do not conflict with each other. In addition, a large quantity of terminal devices can simultaneously perform access, and a terminal device that has been authorized does not need to log off.

In some possible designs, the method further includes:

receiving, by the cloud operating system, an authorization canceling instruction sent by the second terminal device, and sending a second message to the first terminal device, so that when receiving the second message, the first terminal device disconnects from the cloud operating system; or after receiving the second message, the first terminal device disconnects from the cloud operating system within preset duration.

In some possible designs, the first authentication information includes third authentication information that is used to authenticate whether an identity of the first terminal device is valid, and fourth authentication information that is used to verify whether the first terminal device is authorized by the second terminal device to use the remote operating system. The sharing mechanism is further optimized and is applicable to a case that the first terminal device temporarily performs usage.

In some designs, the first authentication information satisfies one of the following:

being valid within preset duration, a quantity of times of usage being limited, or a quantity of times of usage or a quantity of times the cloud operating system is used being limited within preset duration. Validity duration of the first authentication information, a quantity of times of usage, and a quantity of times the cloud operating system has been used are set, so that the second terminal device flexibly controls a time during which the first terminal device is authorized to use the cloud operating system.

A third aspect of this application provides a first terminal device that has a function of implementing the foregoing cloud operation interface sharing method. The function may be implemented by using hardware, or may be implemented by hardware by executing corresponding software. The hardware or software includes one or more modules corresponding to the function, and the modules may be software and/or hardware.

In a possible design, the first terminal device includes:

a receiving module, configured to receive a first message sent by a cloud operating system of a second terminal device;

a display module, configured to display the first message, where the first message carries first authentication information and address information of the cloud operating system, and the first message is used to prompt the first terminal device that the second mobile terminal authorizes the first mobile terminal to use the cloud operating system; and a processing module, configured to request authentication from the cloud operating system by using the first authentication information received by the receiving module;

after the authentication succeeds, establish a connection to the cloud operating system by using the address information;

after the first terminal device is successfully connected to the cloud operating system, receive, by using the receiving module, interface information sent by the cloud operating system; and switch a currently displayed first operation interface to a second operation interface corresponding to the interface information.

In a possible design, the first terminal device includes:

a processor;

a memory, configured to store computer executable program code;

a communications interface; and a receiver, a transmitter, and a display, where the processor, the receiver, the transmitter, the display, the memory, and the communications interface communicate with each other by using a bus; and the processor reads the program code and data that are stored in the memory, where the program code includes an instruction, and when the processor executes the instruction, the instruction enables the processor to perform the following operations:

receiving, by using the receiver, a first message sent by a cloud operating system of a second terminal device, and displaying the first message by using the display, where the first message carries first authentication information and address information of the cloud operating system, and the first message is used to prompt the first terminal device that the second mobile terminal authorizes the first mobile terminal to use the cloud operating system;

requesting authentication from the cloud operating system by using the first authentication information;

after the authentication succeeds, establishing a connection to the cloud operating system by using the address information;

after the first terminal device is successfully connected to the cloud operating system, receiving, by using the receiver, interface information sent by the cloud operating system; and switching a currently displayed first operation interface to a second operation interface corresponding to the interface information.

A fourth aspect of this application provides a cloud server that has a function of implementing the foregoing cloud operation interface sharing method. The function may be implemented by using hardware, or may be implemented by hardware by executing corresponding software. The hardware or software includes one or more modules corresponding to the function, and the modules may be software and/or hardware.

In a possible design, the cloud server includes:

a receiving module, configured to receive an authorization instruction sent by the second terminal device;

a processing module, configured to generate a first message by using the authorization instruction that is received by the receiving module, where the first message carries first authentication information and address information of the cloud operating system; and a sending module, configured to send, to a first terminal device, the first message generated by the processing module, where the first message is used to prompt the first terminal device that the second mobile terminal authorizes the first mobile terminal to use the cloud operating system, where the first authentication information is used by the first terminal device to request authentication from the cloud operating system when the first terminal device requests to use the cloud operating system; and the address information is used by the first terminal device to establish a connection to the cloud operating system after the first terminal device has been authenticated; and the processing module is further configured to: receive, by using the receiving module, the first authentication information sent by the first terminal device, perform authentication on the first authentication information, and after the authentication succeeds, establish the connection to the first terminal device; and send, by using the sending module, interface information to the first terminal device, where the interface information is used by the first terminal device to switch a currently displayed first operation interface to a second operation interface corresponding to the interface information.

In a possible design, the cloud server stores a cloud operating system of a second terminal device, and the cloud server includes:

a processor;

a memory, configured to store computer executable program code;

a communications interface; and a receiver and a transmitter, where the processor, the receiver, the transmitter, the memory, and the communications interface communicate with each other by using a bus; and the processor reads the program code and data that are stored in the memory, where the program code includes an instruction, and when the processor executes the instruction, the instruction enables the processor to perform the following operations:

receiving, by using the receiver, an authorization instruction sent by the second terminal device, and generating a first message by using the authorization instruction, where the first message carries first authentication information and address information of the cloud operating system;

sending, by using the transmitter, the first message to a first terminal device, where the first message is used to prompt the first terminal device that the second mobile terminal authorizes the first mobile terminal to use the cloud operating system, where the first authentication information is used by the first terminal device to request authentication from the cloud operating system when the first terminal device requests to use the cloud operating system; and the address information is used by the first terminal device to establish a connection to the cloud operating system after the first terminal device has been authenticated;

receiving, by using the receiver, the first authentication information sent by the first terminal device, performing authentication on the first authentication information, and after the authentication succeeds, establishing the connection to the first terminal device; and sending, by using the transmitter, interface information to the first terminal device, where the interface information is used by the first terminal device to switch a currently displayed first operation interface to a second operation interface corresponding to the interface information.

A fifth aspect of this application provides a communications system, and the communications system includes:

the first terminal device according to any one of the third aspect or the possible designs of the third aspect; and the cloud server according to any one of the fourth aspect or the possible designs of the fourth aspect.

Compared with the prior art, in the solutions provided in the present invention, a first terminal device receives a first message sent by a cloud operating system, and requests authentication from the cloud operating system by using first authentication information carried in the first message, and after the authentication succeeds, the first terminal device establishes a connection to the cloud operating system by using the address information; and after receiving interface information sent by the cloud operating system, the first terminal device switches a currently displayed first operation interface to a second operation interface corresponding to the interface information. Therefore, there is no need to download or purchase a cloud operating system or an application customized in a cloud operating system, as long as authorization of a second terminal device is obtained, the cloud operating system or the application customized in the cloud operating system can be used, thereby effectively reducing overheads and improving user experience.

BRIEF DESCRIPTION OF DRAWINGS

FIG. 2-1 is another flowchart of a cloud operation interface sharing method according to an embodiment of the present invention;

FIG. 2-2 is another flowchart of a cloud operation interface sharing method according to an embodiment of the present invention;

FIG. 2-3 is another flowchart of a cloud operation interface sharing method according to an embodiment of the present invention;

FIG. 2-4 is another flowchart of a cloud operation interface sharing method according to an embodiment of the present invention;

FIG. 2-5 is another flowchart of a cloud operation interface sharing method according to an embodiment of the present invention;

FIG. 3 is a schematic structural diagram of a first terminal device according to an embodiment of the present invention;

FIG. 3-1 is another schematic structural diagram of a first terminal device according to an embodiment of the present invention;

FIG. 4 is a schematic structural diagram of a cloud server according to an embodiment of the present invention;

FIG. 5 is a schematic structural diagram of a communications system according to an embodiment of the present invention.

DESCRIPTION OF EMBODIMENTS

Figure 1:
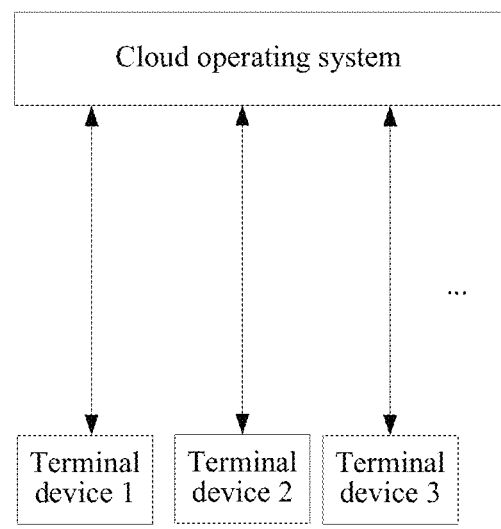
FIG. 1 is an architectural diagram in which a shared cloud operating system is connected to multiple terminal devices according to an embodiment of the present invention.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In the specification, claims, and accompanying drawings of the present invention, the terms "first", "second", and so on are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "have", or any other variant thereof are intended to cover a non-exclusive inclusion. For example, processes, methods, systems, products, or devices that include a series of steps or modules are not limited to the steps or the modules that are clearly listed, and may include other steps and modules that are not clearly listed or that are essential for the processes, methods, products, or devices. Division of modules in this specification is merely logical division, and the modules may have another division manner during actual application. For example, multiple modules may be combined or integrated to another system, or some features may be omitted or not be implemented. In addition, the displayed or discussed mutual couplings or direct couplings or communication connections may be implemented through some interfaces. The indirect couplings or communication connections between the modules may be implemented in electronic, or other forms. This is not limited in this specification. In addition, modules or sub-modules described as separate components may be or may not be physically separated, or may be or may not be physical modules, or may not be grouped into multiple circuit modules. Objectives of the solutions of the embodiments of the present invention may be achieved by selecting some or all of the modules according to actual requirements.

The embodiments of the present invention provide a cloud operating system sharing method, a related device, and a system that are applied to the field of wireless communications technologies. Technical nouns in this specification are described in detail below.

In this specification, a simple operating system is usually an operating system that is pre-installed on a terminal device, such as an operating system that has only basic functions such as calling, a short message service, an address book, SIM card verification, and data connection. In addition to the functions included in the simple operating system, a cloud operating system further has other customized functions, for example, applications such as WeChat, microblog, and map.

Each terminal device in this specification may have at least one cloud operating system and may switch a cloud operating system of the terminal device according to an actual requirement. Each shared cloud operating system may simultaneously establish a connection to at least one terminal device. The terminal devices are independent of each other, and independently interact with the shared cloud operating system and do not affect each other. A specific structure in which a shared cloud operating system simultaneously establishes a connection to at least one terminal device is shown in FIG. 1.

The cloud operating system in this specification is stored in a cloud server. The cloud operating system may be referred to as a cloud computing center operating system, a cloud computing operating system, or a cloud operating system. The cloud operating system is based on a basic hardware resource such as a server, a memory, or a network, and a basic software resource such as a database.

A user may directly log into the cloud operating system to download and install an application. Alternatively, a terminal device may first obtain, from a cloud server, an operation interface corresponding to the cloud operating system, and the terminal device subsequently downloads and installs an application in the cloud operating system by using the operation interface. This is not specifically limited.

The operation interface in this specification is an interface including multiple elements (such as an application icon and a menu), or a user interface (UE, User Interface) including various application icons. That is, as long as an interface may be operated by a user, the interface may be referred to as an operation interface. The operation interface may include at least one of the following:

an operation interface displayed on a terminal device in standby mode, or an operation interface that is displayed in response to an invoke instruction entered by a user, such as an operation interface that corresponds to a first application icon, a first operation interface, and a second operation interface in the following embodiments. Specifically, the operation interface may be a contact operation interface or an application interface.

It should be particularly noted that the terminal device related in the embodiments of the present invention may be a device providing audio and/or data connectivity to a user, a handheld device having a wireless connection function, or another processing device connected to a wireless modem. The wireless terminal may communicate with one or more core networks by using a radio access network (RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a terminal device, a user agent (User Agent), a user device (User Device), or user equipment (User Equipment).

Because permission is granted after payment in a process of sharing an operating system between terminal devices, a quantity of terminal devices that simultaneously use a shared operating system is limited, and a problem of user information security also exists. To resolve the foregoing technical problems, the embodiments of the present invention mainly provide the following technical solutions:

1. A second terminal device notifies, by using a cloud operating system of the second terminal device, a first terminal device that the first terminal device is authorized to use the cloud operating system of the second terminal device.

The second terminal device may actively authorize the first terminal device to use the cloud operating system, or the first terminal device may actively request the second terminal device to authorize usage of the cloud operating system.

A notification message carries authentication information and address information of the cloud operating system. The authentication information is used to authenticate whether an identity of the first terminal device is valid, and verify whether the first terminal device is authorized by the second terminal device to use the cloud operating system of the second terminal device.

2. The first terminal device requests authentication from the cloud operating system of the second terminal device by using first authentication information, and after the authentication succeeds, establishes a connection to the cloud operating system of the second terminal device by using the address information.

3. The cloud operating system of the second terminal device sends corresponding interface information to the first terminal device, so that the first terminal device switches a currently displayed first operation interface to a second operation interface corresponding to the interface information. That is, a shared cloud operating system or a shared application may be switched to. That the first terminal device uses the shared cloud operating system may be understood as that the first terminal device uses an entire cloud operating system or some applications in the cloud operating system. There is at least one first terminal device. Multiple terminal devices may simultaneously use the cloud operating system or some applications in the cloud operating system, and do not conflict with each other. In addition, a large quantity of terminal devices can simultaneously perform access, and a terminal device that has been authorized does not need to log off.

Figure 2:
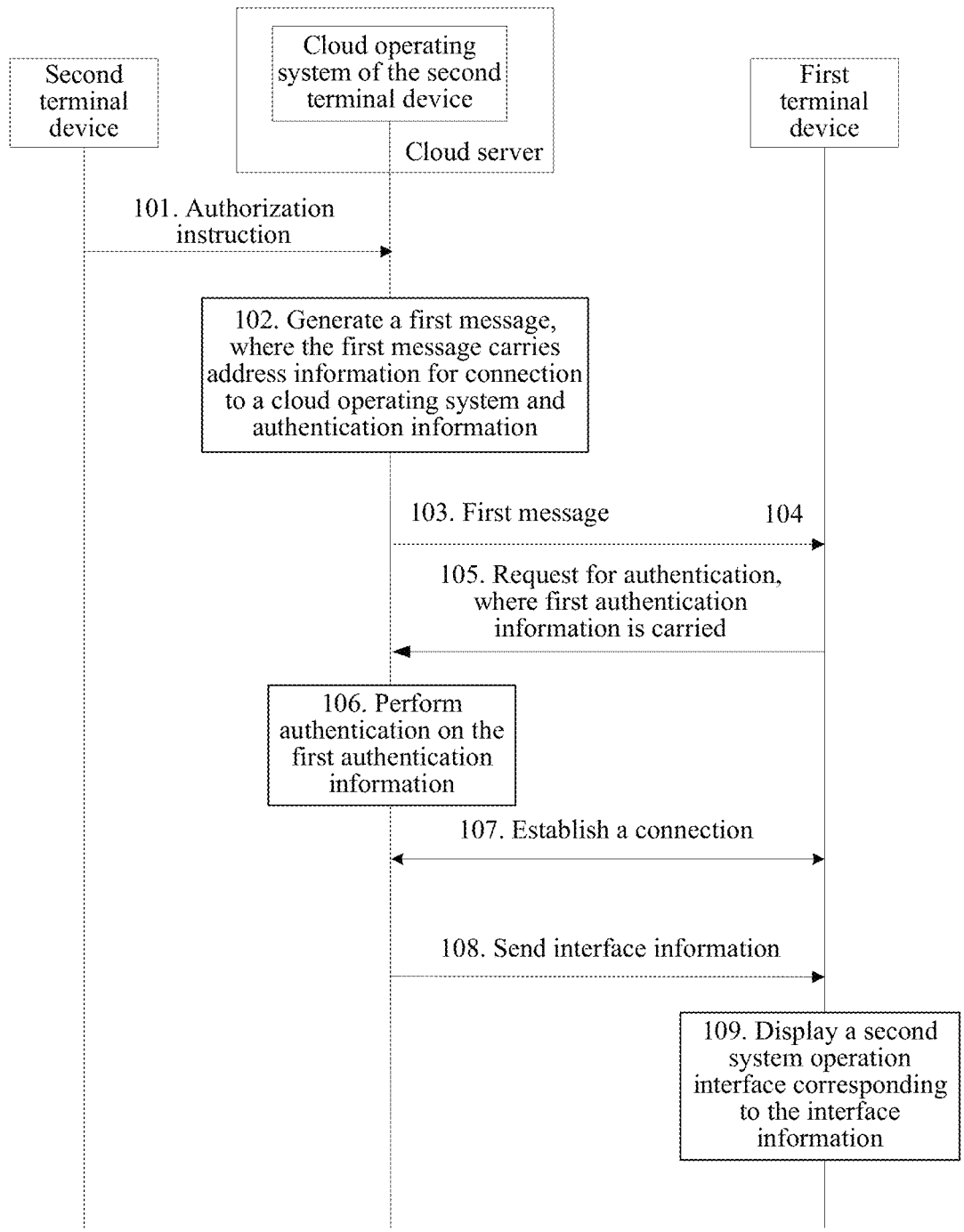
FIG. 2 is a flowchart of a cloud operation interface sharing method according to an embodiment of the present invention.
Figures 1, 2:
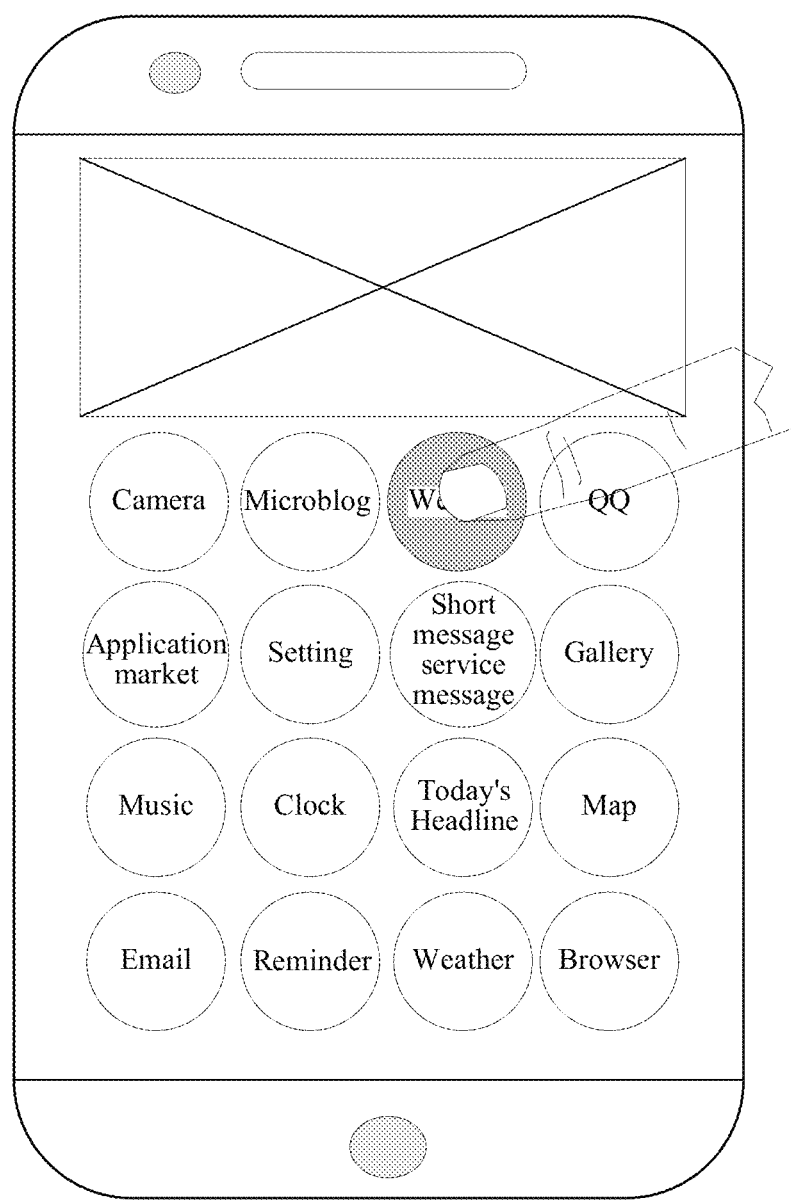
Figure 2:
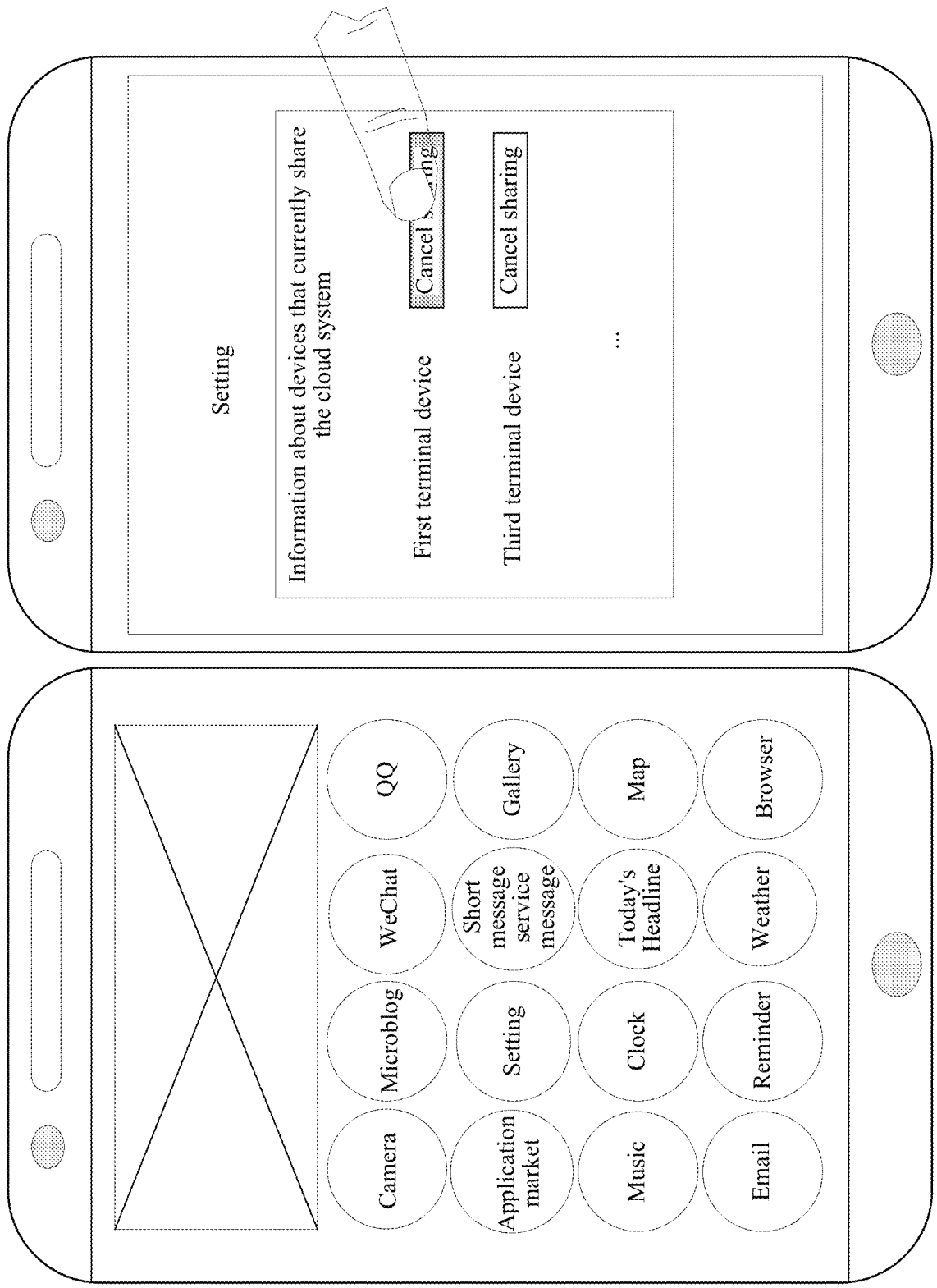

Referring to FIG. 2, an embodiment of the present invention provides a cloud operating system sharing method, and the method includes the following steps.

101: A second terminal device sends an authorization instruction to a cloud operating system of the second terminal device.

It may be known that the authorization instruction includes a device identifier of the second terminal device, a device identifier of a first terminal device, and permission that is used to indicate that the second terminal device authorizes the first terminal device to use the cloud operating system. The permission may be validity duration in which the cloud operating system is used or a quantity of validity times the cloud operating system is used. This is not specifically limited. The device identifier of the second terminal device includes a Media Access Control (MAC, Media Access Control) address, an Internet Protocol (IP, Internet Protocol) address, or an International Mobile Subscriber Identity (IMSI, International Mobile Subscriber Identity) of the second terminal device. This enables the first terminal device to know that the authorization instruction is from the second terminal device, and reduces security risks caused when the first terminal device blindly uses a cloud operating system that is shared by another device when the first terminal device does not know the another device that grants permission.

It may be understood that the second terminal device may send the authorization instruction to the cloud operating system when using the cloud operating system of the second terminal device, or may send the authorization instruction when using a simple operating system. In addition, if the second terminal device has two or more cloud operating systems, when using a cloud operating system A, the second terminal device may send, to a cloud operating system B, an authorization instruction for authorizing the first terminal device to use the cloud operating system B, or may authorize the first terminal device to use the cloud operating system A and the cloud operating system B. A specific implementation and an operating system used by the second terminal device are not limited, as long as the second terminal device can communicate with the cloud operating system that the second terminal device is to be authorized to use.

Optionally, the authorization instruction may be triggered by any one of the following operations or a combination of multiple operations: clicking, pressing, sliding, rotating, twisting, voice inputting, voiceprint inputting, or the like.

102: The cloud operating system of the second terminal device receives the authorization instruction sent by the second terminal device, and generates a first message by using the authorization instruction.

The first message carries first authentication information and address information of the cloud operating system, and the first authentication information is used by the first terminal device to request authentication from the cloud operating system when the first terminal device requests to use the cloud operating system. The address information is used by the first terminal device to establish a connection to the cloud operating system after the first terminal device has been authenticated.

The first authentication information includes third authentication information that is used to authenticate whether an identity of the first terminal device is valid, that is, the third authentication information is authentication information about authorization granted by the second terminal device to the first terminal device to use the cloud operating system, and fourth authentication information that is used to verify whether the first terminal device is authorized by the second terminal device to use the remote operating system. Optionally, the third authentication information satisfies one of the following:

being valid within preset duration, a quantity of times of validity being limited, or a quantity of times of usage being limited within preset duration. Validity duration of the first authentication information is set, so that the second terminal device flexibly controls a time during which the first terminal device is authorized to use the cloud operating system.

Optionally, the address information may be an Internet address such as a uniform resource locator (URL, Uniform Resource Locator), and the third authentication information may be a password.

103: The cloud operating system sends the first message to a first terminal device.

The first message is used to prompt the first terminal device that the second mobile terminal authorizes the first mobile terminal to use the cloud operating system.

The first message may be sent by using a message server. For example, the first message may be sent in such manners as a short message service message, a multimedia message service, an email, push, short distance wireless data communication, and instant messaging (IM, Instant Messaging). This is not specifically limited.

104. The first terminal device receives and displays the first message sent by the cloud operating system of the second terminal device.

The first message may be displayed in a form of an icon, such as a prompt box. A specific reflection form is not limited. For example, the second terminal device displays a short message service message icon or an email icon, prompting a user of the second terminal device that the second terminal device authorizes the first terminal device to use the cloud operating system of the second terminal device.

105: The first terminal device requests authentication from the cloud operating system by using the first authentication information.

106: The cloud operating system receives the first authentication information sent by the first terminal device, performs authentication on the first authentication information, and after the authentication succeeds, establishes a connection to the first terminal device.

After the authentication succeeds, the cloud operating system further generates a file directory of the first terminal device, and the file directory of the first terminal device is used to store usage data that is generated by the first terminal device when the first terminal device uses the cloud operating system. The usage data that is generated during use of the cloud operating system may be data that is generated when an entire cloud operating system is used, or may be data that is generated when some applications in the cloud operating system are used. This is not specifically limited, and similarity between the two types of data is not described again. Usage data generated by terminal devices that use the same cloud operating system is separately stored, so that it is convenient for a user to view usage data of the user. Usage data of the first terminal device or usage data of the second terminal device includes operation data, log information, a browsing record, a chatting record, account information, and user information that are generated when the user uses an application icon on a second system operation interface. This is not specifically limited.

It may be understood that after the second terminal device has been authenticated for the first time, the cloud operating system of the second terminal device generates a file directory of the second terminal device for the second terminal device. The file directory of the second terminal device is used to store usage data that is generated during use of the cloud operating system by the second terminal device.

It may be known that because the cloud operating system of the second terminal device separately generates, for the first terminal device and the second terminal device, file directories that are independent of each other, so that the file directory of the first terminal device and the file directory of the second terminal device are independent of each other. Therefore, the first terminal device and the second terminal device can access only their own file directories. File directories of terminal devices that use a same cloud operating system are independent of each other, information security is improved to some extent, and user information leakage risks are reduced. Specifically, the following manners are included:

a. Corresponding passwords are separately set for terminal devices that use a same cloud operating system, and when a terminal device accesses a directory file of the terminal device, the terminal device may access the file directory of the terminal device by performing authentication on a password.

b. Corresponding passwords are separately set for terminal devices that use a same cloud operating system, and a terminal device may directly access a file directory of the terminal device without using a password, but other terminal devices need to perform authentication on passwords if the other terminal devices want to perform access.

c. It may be further set that each terminal device can view only a file directory of the terminal device and cannot view file directories of other terminal devices that use a same cloud operating system.

This is not limited in this specification as long as the terminal devices that use the same cloud operating system cannot access or directly access the file directories of the other terminal devices.

107: After the authentication succeeds, the first terminal device establishes a connection to the cloud operating system by using the address information.

108: The cloud operating system sends interface information to the first terminal device.

The interface information is used by the first terminal device to switch a currently displayed first operation interface to a second operation interface corresponding to the interface information.

The interface information is elements for forming the second operation interface and ranking relationships of the elements. For example, the interface information may include icons (Application, App) of applications customized by a user, information about ranking relationships between the icons of the applications, and a display manner of the icons of the applications. Information that is specifically included is not limited. The user may send a request to a cloud server to execute an App by clicking an icon of the App.

Optionally, when the second terminal device authorizes to share an application, the interface information includes at least one application icon, and the second operation interface is an operation interface that includes the at least one application icon. Some applications in a shared cloud operating system can be used without being downloaded.

When the second terminal device authorizes to share an entire cloud operating system, the interface information includes entry information corresponding to the cloud operating system, and the second operation interface is an operation interface corresponding to the cloud operating system. The entry information includes elements, an icon ranking sequence, and a display manner that are used to display the entire cloud operating system. A cloud operating system can be shared without being downloaded.

Sharing of some applications in the cloud operating system is authorized, or sharing of the entire cloud operating system is authorized, so that sharing permission is flexibly controlled, and a sharing mechanism is optimized.

Optionally, the cloud server may automatically identify a device model or a user category of the first terminal device and allocate a suitable cloud operating system to the first terminal device. For example, when a device model of the second terminal device is different from a device model of the first terminal device, a cloud operating system that can be fluently used by the first terminal device may be allocated to the first terminal device. A version of the cloud operating system may be later than or earlier than that of the cloud operating system used by the second terminal device. That is, versions of cloud operating systems used by the first terminal device and the second terminal device may be different. This is not specifically limited in this specification.

109: After the first terminal device is connected to the cloud operating system, the first terminal device receives the interface information sent by the cloud operating system, and the first terminal device switches a currently displayed first operation interface to a second operation interface corresponding to the interface information.

The first operation interface includes one of the following: an operation interface corresponding to an operating system pre-installed on the first terminal device, an operation interface corresponding to the cloud operating system of the first terminal device, an operation interface corresponding to a cloud operating system shared by terminal devices except the first terminal device, or an operation interface corresponding to some applications in a cloud operating system shared by terminal devices except the first terminal device. The terminal devices except the first terminal device include the second terminal device, and a terminal device other than the first terminal device and the second terminal device. It indicates that currently, the first terminal device may use another cloud operating system or some applications shared by the second terminal device, or may use a cloud operating system or some applications shared by the terminal device other than the first terminal device and the second terminal device. This is not specifically limited. In addition, the pre-installed operating system may be understood as a simple operating system.

It may be understood that when the second terminal device establishes a connection to the cloud operating system, the second terminal device also needs to submit corresponding authentication information to the cloud operating system, receives interface information sent by the cloud operating system after authentication succeeds, and displays the second operation interface corresponding to the interface information. A detailed procedure is not described again.

In this embodiment of the present invention, a second terminal device authorizes a first terminal device to use a cloud operating system of the second terminal device, the first terminal device receives a first message sent by the cloud operating system, and requests authentication from the cloud operating system by using first authentication information carried in the first message, and after the authentication succeeds, the first terminal device establishes a connection to the cloud operating system by using address information; and after receiving interface information sent by the cloud operating system, the first terminal device switches a currently displayed first operation interface to a second operation interface corresponding to the interface information. Therefore, there is no need to download or purchase a cloud operating system or an application customized in a cloud operating system, as long as authorization of the second terminal device is obtained, the cloud operating system or the application customized in the cloud operating system can be used, thereby effectively reducing traffic consumption and overheads and improving user experience.

It may be understood that when the first terminal device is connected to the cloud operating system of the second terminal device, the second terminal device may use the cloud operating system of the second terminal device, or may use the pre-installed simple operating system, or may use a cloud operating system that another terminal device is authorized to use. A specific scenario is not limited.

Optionally, in some possible embodiments, after the first terminal device establishes the connection to the cloud operating system of the second terminal device, the method further includes:

detecting, by the first terminal device, a first input of a user on a first application icon on the second operation interface;

sending, by the first terminal device, an operation instruction for the first application icon to the cloud operating system in response to the detected first input; and receiving, by the cloud operating system, the operation instruction sent by the first terminal device, performing an operation corresponding to the operation instruction, and storing operation data generated by the operation in a file directory of the first terminal device, where the file directory of the first terminal device is a file directory generated for the first terminal device after the cloud operating system has authenticated the first terminal device. Because the operation data of the first terminal device is stored in the file directory of the first terminal device, the first terminal device may view at any time records of using the cloud operating system, but other terminal devices that use the cloud operating system cannot access the file directory of the first terminal device. That is, file directories of the terminal devices that use the same cloud operating system are independent of each other. Therefore, information security is improved to some extent, and user information leakage risks are reduced.

The first terminal device receives and displays an operation interface that is sent by the cloud operating system and that corresponds to the first application icon. An application on a shared second operation interface can be operated without being downloaded. A usage fee can be reduced, and traffic consumption can also be reduced.

For example, as shown in FIG. 2-1, after the first terminal device detects a clicking operation performed by a user 1 on an icon of WeChat on the second operation interface, the first terminal device sends a request to obtain a WeChat logging interface to a cloud server by means of network connection, and receives and displays the WeChat logging interface returned by the cloud server. By submitting the first authentication information (which is buffered earlier or newly input) to the cloud operating system by using the first terminal device, the user 1 can successfully log into the application of WeChat that is in the cloud operating system and that corresponds to a user 2, and perform functions such as calling by using WeChat. When the user 1 logs into the cloud operating system to use WeChat, the user 2 of the second terminal device can also use WeChat at the same time, and the user 1 and the user 2 are not interfered by each other.

Optionally, in some possible embodiments, after the first terminal device uses the cloud operating system of the second terminal device for a period of time, the first terminal device may disconnect from the cloud operating system and return to the first operation interface. Specific reasons may be that: a time authorized by the second terminal device to the first terminal device to use the cloud operating system is reached, or the second terminal device actively requests to cancel the authorization to the first terminal device, or the connection is disconnected due to poor network signals, or the first terminal device actively disconnects from a network, or the first terminal device actively logs off the cloud operating system of the second terminal device. This is not specifically limited.

Optionally, the disconnecting, by the first terminal device, from the cloud operating system is implemented in one of the following manners:

requesting, by the first terminal device, the cloud operating system to cancel the connection to the cloud operating system; and disconnecting, by the first terminal device, from a network; or receiving, by the first terminal device, a second message sent by the cloud operating system, where the second message is used to prompt the first terminal device that the second mobile terminal cancels the authorization obtained by the first mobile terminal to use the cloud operating system.

Optionally, the disconnecting, by the first terminal device, from the cloud operating system includes:

when the first terminal device receives the second message sent by the cloud operating system, disconnecting, by the first terminal device, from the cloud operating system; or after the first terminal device receives the second message sent by the cloud operating system, disconnecting, by the first terminal device, from the cloud operating system within preset duration. The sharing mechanism is further optimized and is applicable to a case that the first terminal device temporarily performs usage.

Figures 2, 3:
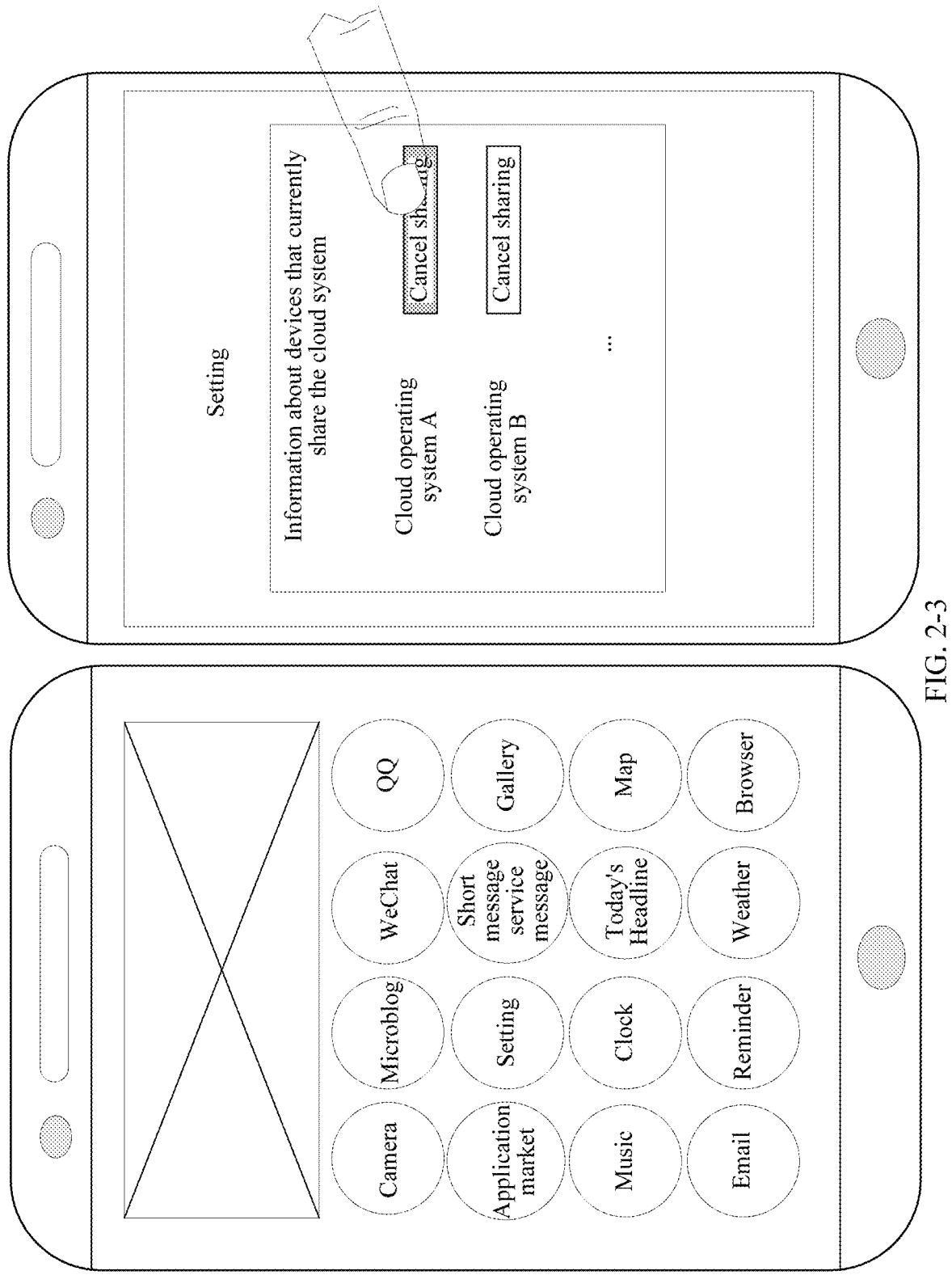

For example, when actively canceling the authorization to the first terminal device, the second terminal device may click an icon of setting on a currently displayed second system operation interface and display a sharing list (as shown in FIG. 2-2) that is currently shared with other terminal devices. The second terminal device finds, from the sharing list, a drop-down list for authentication to the first terminal device, clicks a key of canceling sharing, and then cancels the authentication to the first terminal device. Optionally, the sharing list may be a drop-down list for each authorized terminal device, or may be a drop-down list (as shown in FIG. 2-3) for authorization of two or more cloud operating systems of the second terminal device. For example, when the sharing list is for two or more cloud operating systems, the second terminal device may select at least one shared cloud operating system (for example, cancel a cloud operating system A), and perform an operation of canceling sharing. In this case, authorization to all terminal devices connected to the cloud operating system whose sharing is canceled is canceled.

Figures 2, 3, 4:
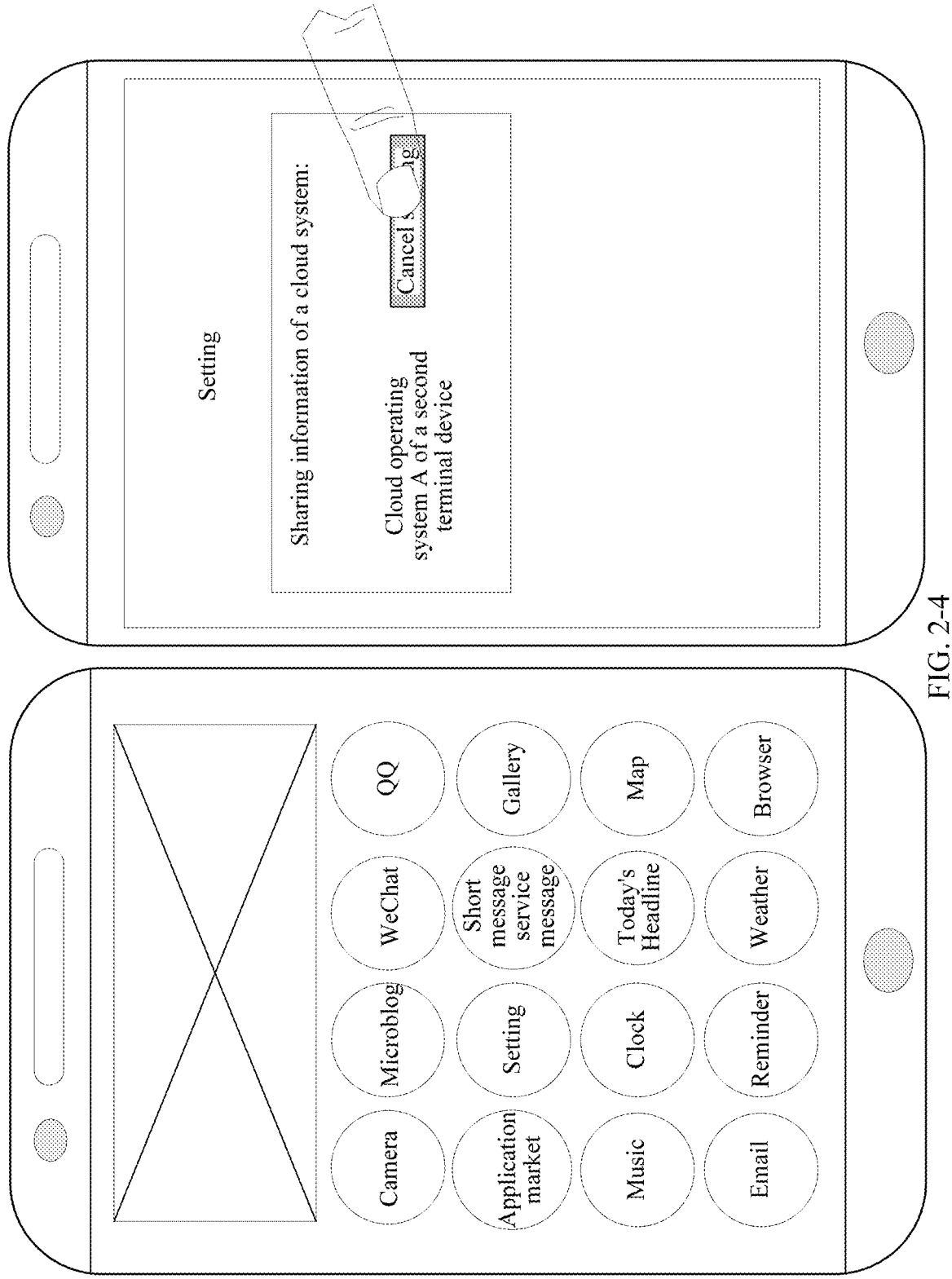

For another example, when actively canceling the authorization of the second terminal device, the first terminal device may click an icon (as shown in FIG. 2-4) of setting on a currently displayed second system operation interface, display a sharing list, click a key of canceling sharing, and cancel using the cloud operating system of the second terminal device. Alternatively, a displayed sharing list may further be a drop-down list (as shown in FIG. 2-5) in which other terminal devices authorize the first terminal device to use cloud operating systems of the terminal devices, and the first terminal device may select any one of the terminal devices, and cancel authorization of the terminal device to the first terminal device. A specific scenario is not limited in this specification.

Optionally, when the first terminal device actively requests to cancel the authorization, the cloud operating system records the event that the first terminal device actively requests to cancel the authorization, or when the second terminal device actively cancels the authorization, the cloud operating system records the event that the second terminal device actively cancels the authorization.

In addition, when the first terminal device disconnects from the cloud operating system for the first time, the cloud operating system may delete the file directory of the first terminal device, and when the first terminal device requests later to establish a connection again, re-generate a new file directory for the first terminal device. Alternatively, the cloud operating system may reserve the file directory of the first terminal device, and when the first terminal device requests later to establish a connection again, update the file directory of the first terminal device. This is not specifically limited.

Optionally, the cloud operating system of the second terminal device may be set to periodically clean stored file directories of the terminal devices, or when a total size of the file directories of the terminal devices that are connected to the cloud operating system exceeds a particular volume, the cloud operating system of the second terminal device may preferentially clean a file directory of a terminal device that does not use the cloud operating system for a long time. This is not specifically limited in this specification.

The description of the cloud operation interface sharing method in this embodiment of the present invention is provided above as an example, and a description of a first terminal device or a cloud server that performs the cloud operation interface sharing method is provided below.

1. Referring to FIG. 3, a first terminal device 30 in an embodiment of the present invention includes a receiving module 301, a display module 302, and a processing module 303.

The receiving module 301 is configured to receive a first message sent by a cloud operating system of a second terminal device.

The display module 302 is configured to display the first message, where the first message carries first authentication information and address information of the cloud operating system, and the first message is used to prompt the first terminal device that the second mobile terminal authorizes the first mobile terminal to use the cloud operating system. Optionally, the first authentication information includes third authentication information that is used to authenticate whether an identity of the first terminal device is valid, and fourth authentication information that is used to verify whether the first terminal device is authorized by the second terminal device to use the remote operating system.

The processing module 303 is configured to request authentication from the cloud operating system by using the first authentication information received by the receiving module 301;

after the authentication succeeds, establish a connection to the cloud operating system by using the address information;

after the first terminal device is successfully connected to the cloud operating system, receive, by using the receiving module 301, interface information sent by the cloud operating system. Optionally, when the second terminal device authorizes the first terminal device to use some applications in the cloud operating system, that is, when the interface information includes at least one application icon, the second operation interface is an operation interface that includes at least one application icon; and when the second terminal device authorizes the first terminal device to use an entire cloud operating system, that is, when the interface information includes entry information corresponding to the cloud operating system, the second operation interface is an operation interface corresponding to the cloud operating system; and switch a currently displayed first operation interface to a second operation interface corresponding to the interface information.

In this embodiment of the present invention, the receiving module 301 receives a first message sent by a cloud operating system, and the processing module 302 requests authentication from the cloud operating system by using the first authentication information carried in the first message, and after the authentication succeeds, establishes the connection to the cloud operating system by using the address information; and after the receiving module 301 receives the interface information sent by the cloud operating system, the processing module 302 switches the currently displayed first operation interface to the second operation interface corresponding to the interface information. Therefore, there is no need to download or purchase a cloud operating system or an application customized in a cloud operating system, as long as authorization of a second terminal device is obtained, the cloud operating system or the application customized in the cloud operating system can be used, thereby effectively reducing traffic consumption and overheads and improving user experience.

Optionally, in some embodiments of the present invention, referring to FIG. 3-1, the first terminal device 30 further includes a sensing module 304 and a sending module 305. After obtaining the second operation interface, the first terminal device 30 operates the second operation interface. That is, the processing module 303 may further detect, by using the sensing module 304, a first input of a user on a first application icon on the second operation interface;

send, by using the sending module 305, an operation instruction for the first application icon to the cloud operating system in response to the detected first input, so that the cloud operating system performs an operation corresponding to the operation instruction, and stores operation data generated by the operation in a file directory of the first terminal device, where the file directory of the first terminal device is a file directory generated for the first terminal device after the cloud operating system has authenticated the first terminal device; and receive, by using the receiving module 301, an operation interface that is sent by the cloud operating system and that corresponds to the first application icon, and display, by using the display module 302, the operation interface corresponding to the first application icon.

Optionally, after the first terminal device 30 uses the cloud operating system for a period of time, corresponding usage data is generated accordingly. The first terminal device 30 may view the usage data of the first terminal device 30. Specifically, the processing module 303 may further detect, by using the sensing module 304, second authentication information entered by the user, and send, by using the sending module 305, the second authentication information to the cloud operating system; and after authentication succeeds, access a file directory of the first terminal device, where the file directory of the first terminal device is used to store usage data that is generated by the first terminal device when the first terminal device uses the cloud operating system.

Optionally, in some embodiments of the present invention, after using the cloud operating system for a period of time, the first terminal device 30 may disconnect from the cloud operating system. Specifically, the processing module 303 is further configured to:

disconnect from the cloud operating system, and switch to the first operation interface.

Optionally, the processing module 303 specifically performs one of the following operations:

requesting, by using the sending module 305, the cloud operating system to cancel the connection to the cloud operating system; and disconnecting from a network; or receiving, by using the receiving module 301, a second message sent by the cloud operating system, where the second message is used to prompt the first terminal device that the second mobile terminal cancels the authorization obtained by the first mobile terminal to use the cloud operating system.

2. Referring to FIG. 4, a cloud server 40 in an embodiment of the present invention includes a receiving module 401, a processing module 402, and a sending module 403.

The receiving module 401 is configured to receive an authorization instruction sent by a second terminal device.

The processing module 402 is configured to generate a first message by using the authorization instruction that is received by the receiving module 401, where the first message carries first authentication information and address information of the cloud operating system.

The sending module 403 is configured to send, to a first terminal device, the first message generated by the processing module 402, where the first message is used to prompt the first terminal device that the second mobile terminal authorizes the first mobile terminal to use the cloud operating system.

The first authentication information is used by the first terminal device to request authentication from the cloud operating system when the first terminal device requests to use the cloud operating system; and the address information is used by the first terminal device to establish a connection to the cloud operating system after the first terminal device has been authenticated. Optionally, the first authentication information includes third authentication information that is used to authenticate whether an identity of the first terminal device is valid, and fourth authentication information that is used to verify whether the first terminal device is authorized by the second terminal device to use the remote operating system. The third authentication information satisfies one of the following:

being valid within preset duration, a quantity of times of validity being limited, or a quantity of times of usage or a quantity of times the cloud operating system is used being limited within preset duration.

The processing module 402 is further configured to: receive, by using the receiving module 401, the first authentication information sent by the first terminal device, perform authentication on the first authentication information, and after the authentication succeeds, establish the connection to the first terminal device; and send, by using the sending module 403, interface information to the first terminal device, where the interface information is used by the first terminal device to switch a currently displayed first operation interface to a second operation interface corresponding to the interface information. Optionally, when the interface information includes at least one application icon, the second operation interface is an operation interface that includes the at least one application icon; when the interface information includes entry information corresponding to the cloud operating system, the second operation interface is an operation interface corresponding to the cloud operating system.

In this embodiment of the present invention, after the receiving module 301 receives an authorization instruction sent by a second terminal device, the processing module 302 generates a first message by using the authorization instruction and sends, by using the sending module 403, the first message to a first terminal device 30, so that after receiving the first message, the first terminal device 30 requests authentication from a cloud operating system by using first authentication information, and after receiving interface information sent by the cloud operating system, switches a currently displayed first operation interface to a second operation interface corresponding to the interface information. Therefore, there is no need to download or purchase a cloud operating system or an application customized in a cloud operating system, as long as authorization of the second terminal device is obtained, the cloud operating system or the application customized in the cloud operating system can be used, thereby effectively reducing traffic consumption and overheads and improving user experience.

Optionally, in some embodiments of the present invention, after the first terminal device has been authenticated by the processing module 402, the processing module 402 is further configured to perform the following operation:

generating a file directory of the first terminal device, where the file directory of the first terminal device is used to store usage data that is generated by the first terminal device when the first terminal device uses the cloud operating system.

Optionally, in some embodiments of the present invention, the processing module 402 is further configured to execute the following operations:

receiving, by using the receiving module 401, an operation instruction sent by the first terminal device, where the operation instruction is a first input of a user on a first application icon on the second operation interface;

performing an operation corresponding to the operation instruction, and storing operation data generated by the operation in the file directory of the first terminal device; and sending, by using the sending module 403, an operation interface corresponding to the first application icon to the first terminal device.

Optionally, in some embodiments of the present invention, the processing module 402 is further configured to execute the following operation:

receiving, by using the receiving module 401, second authentication information sent by the first terminal device, and performing authentication on the first terminal device, where the second authentication information is used by the first terminal device to access the file directory of the first terminal device.

Optionally, in some embodiments of the present invention, the processing module 402 is further configured to execute the following operation:

receiving, by using the receiving module 401, an authorization canceling instruction sent by the second terminal device, and sending, by using the sending module 403, a second message to the first terminal device, so that when receiving the second message, the first terminal device disconnects from the cloud operating system; or after receiving the second message, the first terminal device disconnects from the cloud operating system within preset duration.

Figures 2, 3, 4, 5:
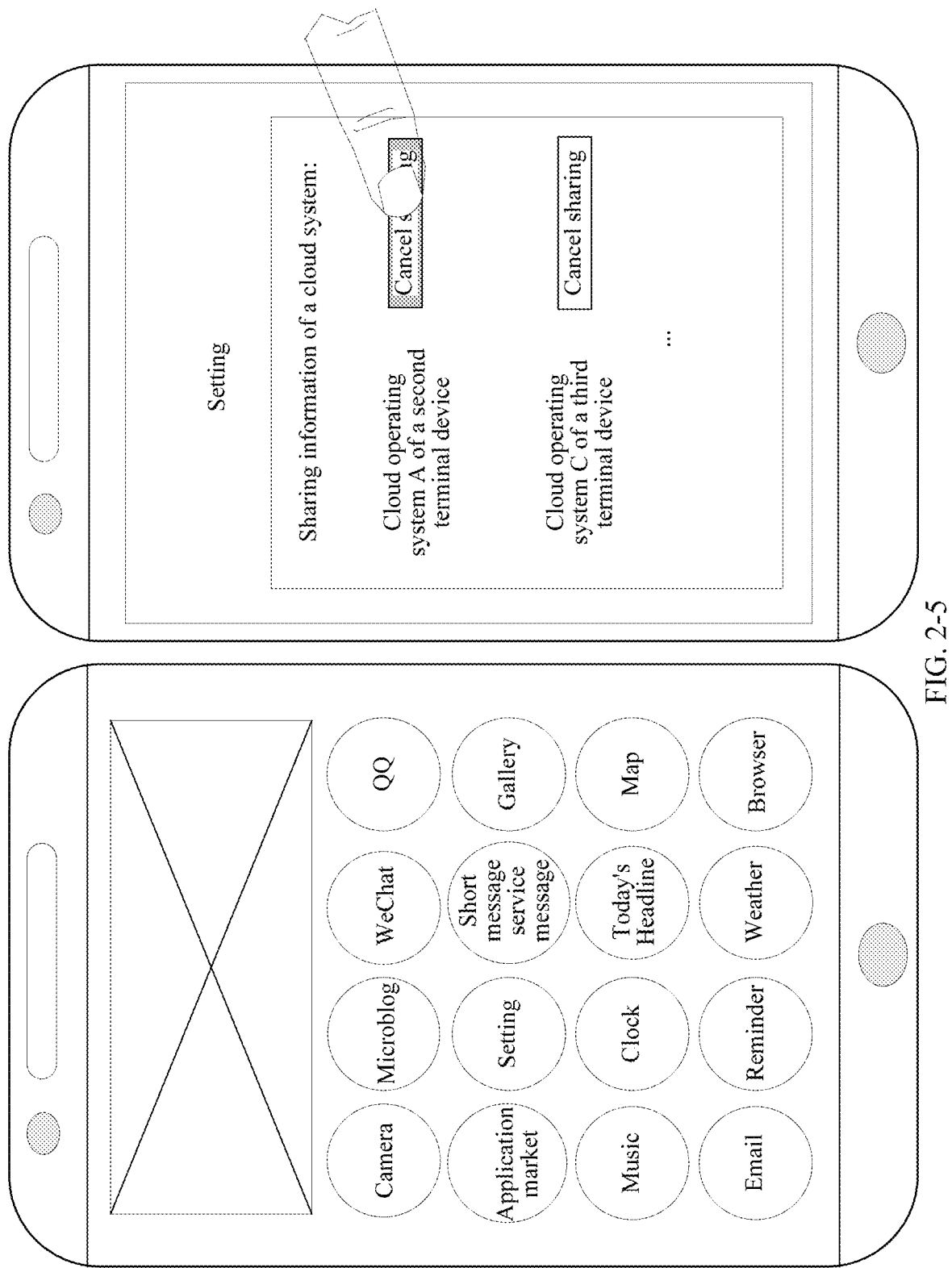
Figure 3:
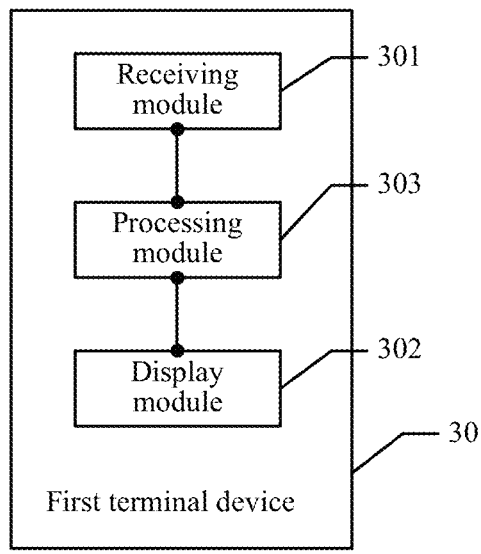
Figures 1, 3:
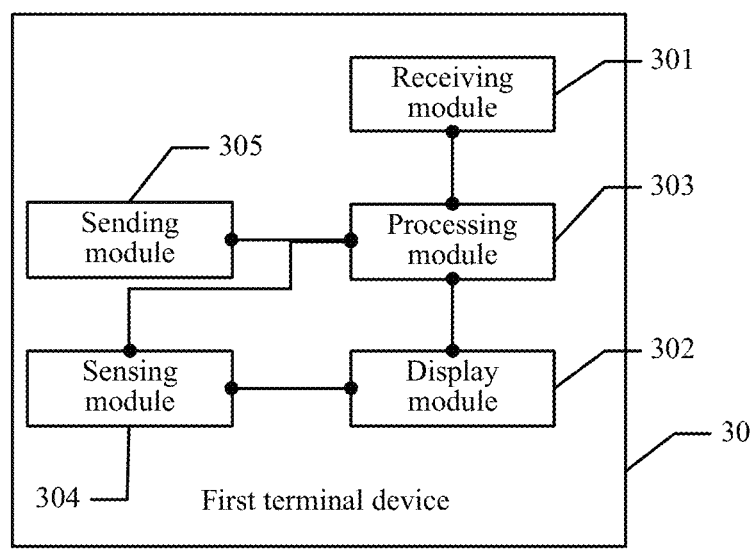
Figure 4:
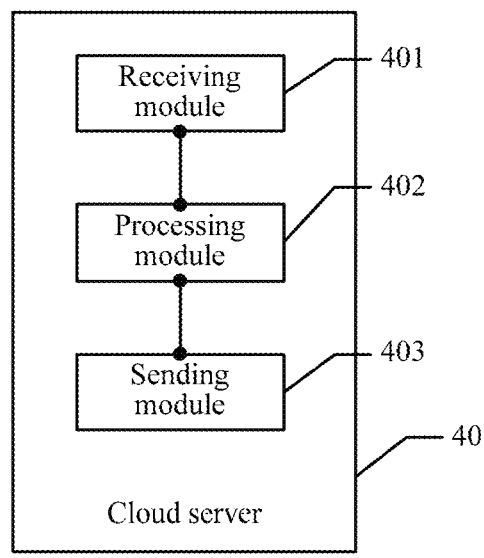
Figure 5:
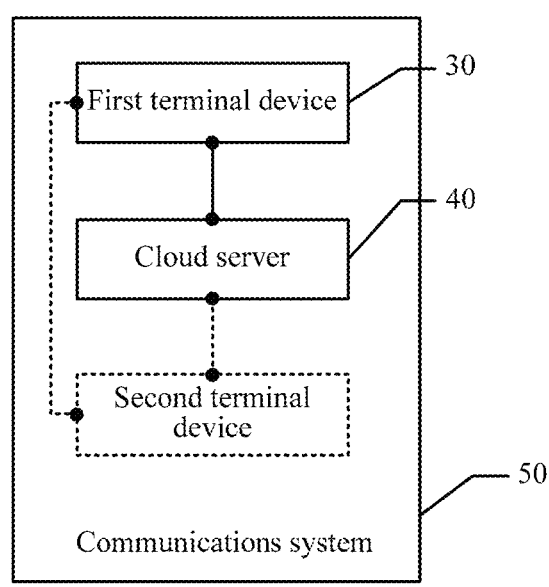

3. Referring to FIG. 5, a communications system 50 includes:

the first terminal device 30 according to FIG. 3; and
the cloud server 40 according to FIG. 4.

Figure 6:
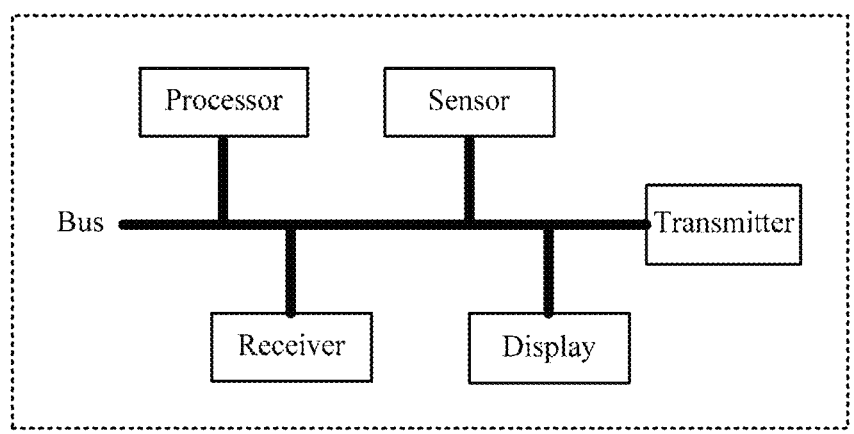
FIG. 6 is a schematic structural diagram of an entity apparatus for performing a cloud operation interface sharing method according to an embodiment of the present invention.

It should be noted that in the embodiments (including the embodiments shown in FIG. 3 and FIG. 4) of the present invention, entity devices corresponding to all receiving modules may be receivers, entity devices corresponding to all sending modules may be transmitters, entity devices corresponding to all processing modules may be processors, entity devices corresponding to all sensing modules may be sensors, and entity devices corresponding to all display modules may be display screens or displays. The apparatuses shown in FIG. 3 and FIG. 4 may have a structure shown in FIG. 6. When one of the apparatuses have the structure shown in FIG. 6, a processor, a transmitter, and a receiver in FIG. 6 implements the same or similar functions of the processing modules, the sending modules, and the receiving modules provided in the apparatus embodiments corresponding to the apparatus.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The cloud operation interface sharing method, the related device, and the system provided in the present invention are described in detail above. The principle and implementation of the present invention are described in this specification by using specific examples. The description about the embodiments is merely provided to help understand the method and core ideas of the present invention. In addition, persons of ordinary skills in the art can make variations and modifications to the present invention in terms of the specific implementations and application scopes according to the ideas of the present invention. Therefore, the content of specification shall not be construed as a limit to the present invention.

What is claimed is:

1. A cloud operation interface sharing method, wherein the method comprises:
receiving and displaying, by a first terminal device, a first message that is generated and sent by a cloud operating system of a second terminal device, wherein the first message carries first authentication information and address information of the cloud operating system, and the first message informs the first terminal device that the second terminal device authorizes the first terminal device to share the cloud operating system of the second terminal device while the cloud operating system is being used by the second terminal device;
requesting, by the first terminal device by using the first authentication information, authentication from the cloud operating system;
after the authentication succeeds, establishing, by the first terminal device, a connection to the cloud operating system by using the address information;
after the first terminal device is successfully connected to the cloud operating system, receiving, by the first terminal device, interface information sent by the cloud operating system, wherein the interface information includes icons of applications customized by a user, information about ranking relationships between the icons of the applications, and a display manner of the icons of the applications;
switching, by the first terminal device, a currently displayed first operation interface to a second operation interface corresponding to the interface information; and
storing, by the first terminal device and in a first file directory, usage data that is generated when the first terminal device uses the cloud operating system, wherein (1) the first file directory is separate from a second file directory corresponding to the second terminal device, (2) each of the first file directory and the second file directory is generated by the cloud operating system and is stored in a cloud server, (3) usage data in the second file directory is accessible by the second terminal device and is inaccessible by the first terminal device, and (4) the usage data in the first file directory is accessible by the first terminal device and is inaccessible by the second terminal device.

2. The method according to claim 1, wherein the method further comprises:
detecting, by the first terminal device, a first input of a user on a first application icon on the second operation interface;
sending, by the first terminal device, an operation instruction for the first application icon to the cloud operating system in response to the detected first input, wherein the operation instruction instructs the cloud operating system to perform an operation corresponding to the operation instruction, and store operation data generated by the operation in the first file directory, wherein the first file directory is generated for the first terminal device after the cloud operating system has authenticated the first terminal device; and
receiving and displaying, by the first terminal device, an operation interface that is sent by the cloud operating system and that corresponds to the first application icon.

3. The method according to claim 1, wherein the second operation interface is an operation interface that comprises at least one application icon included in the interface information.

4. The method according to claim 1, wherein when the interface information comprises entry information corresponding to the cloud operating system, the second operation interface is an operation interface corresponding to the cloud operating system.

5. The method according to claim 2, wherein the method further comprises:
detecting, by the first terminal device, second authentication information entered by the user, and sending the second authentication information to the cloud operating system; and
after authentication succeeds, accessing, by the first terminal device, the first file directory.

6. The method according to claim 1, wherein the method further comprises:
disconnecting, by the first terminal device, from the cloud operating system, and switching to the first operation interface.

7. The method according to claim 6, wherein the disconnecting, by the first terminal device, from the cloud operating system is implemented in one of the following manners:
requesting, by the first terminal device, the cloud operating system to cancel the connection to the cloud operating system; and
disconnecting, by the first terminal device, from a network; or
receiving, by the first terminal device, a second message sent by the cloud operating system, wherein the second message informs the first terminal device that the second terminal device cancels the authorization obtained by the first terminal device to use the cloud operating system.

8. The method according to claim 7, wherein the disconnecting, by the first terminal device, from the cloud operating system comprises:
when the first terminal device receives the second message sent by the cloud operating system, disconnecting, by the first terminal device, from the cloud operating system; or
after the first terminal device receives the second message sent by the cloud operating system, disconnecting, by the first terminal device, from the cloud operating system within preset duration.

9. The method according to claim 1, wherein the first authentication information comprises third authentication information authenticates whether an identity of the first terminal device is valid, and fourth authentication information that verifies whether the first terminal device is authorized by the second terminal device to use the cloud operating system.

10. A first terminal device, wherein the first terminal device comprises:
at least one processor;
a non-transitory computer-readable storage medium coupled to the at least one processor and storing computer executable program code for execution by the at least one processor;
a communications interface;
a receiver;
a transmitter; and
a display;
wherein:

the at least one processor, the receiver, the transmitter, the display, the non-transitory computer-readable storage medium, and the communications interface communicate with each other by using a bus; and the at least one processor reads the program code and data that are stored in the non-transitory computer-readable storage medium, wherein the program code comprises instructions, and when the at least one processor executes the instructions, the instructions instructing the at least one processor to perform operations comprising:

receiving, by using the receiver, a first message generated and sent by a cloud operating system of a second terminal device, and displaying the first message by using the display, wherein the first message carries first authentication information and address information of the cloud operating system, and the first message informs the first terminal device that the second terminal device authorizes the first terminal device to share the cloud operating system of the second terminal device while the cloud operating system is being used by the second terminal device;

requesting authentication from the cloud operating system by using the first authentication information;

after the authentication succeeds, establishing a connection to the cloud operating system by using the address information;

after the first terminal device is successfully connected to the cloud operating system, receiving, by using the receiver, interface information sent by the cloud operating system, wherein the interface information includes icons of applications customized by a user, information about ranking relationships between the icons of the applications, and a display manner of the icons of the applications;

switching a currently displayed first operation interface to a second operation interface corresponding to the interface information;

storing usage data that is generated when the first terminal device uses the cloud operating system in a first file directory corresponding to the first terminal, wherein (1) the first file directory is separate from a second file directory corresponding to the second terminal device, (2) each of the first file directory and the second file directory is generated by the cloud operating system and is stored in a cloud server, (3) usage data in the second file directory is accessible by the second terminal device and is inaccessible by the first terminal device, and (4) the usage data in the first file directory is accessible by the first terminal device and is inaccessible by the second terminal device.

11. The first terminal device according to claim 10, wherein the first terminal device further comprises a sensor and the operations further comprise:

detecting, by using the sensor, a first input of a user on a first application icon on the second operation interface;

sending, by using the transmitter, an operation instruction for the first application icon to the cloud operating system in response to the detected first input, wherein the operation instruction instructs the cloud operating system to perform an operation corresponding to the operation instruction, and store operation data generated by the operation in the first file directory, wherein the first file directory is generated for the first terminal device after the cloud operating system has authenticated the first terminal device; and receiving by using the receiver, an operation interface that is sent by the cloud operating system and that corresponds to the first application icon, and displaying, by using the display, the operation interface corresponding to the first application icon.

12. The first terminal device according to claim 10, wherein the second operation interface is an operation interface that comprises at least one application icon included in the interface information.

13. The first terminal device according to claim 10, wherein when the interface information comprises entry information corresponding to the cloud operating system, the second operation interface is an operation interface corresponding to the cloud operating system.

14. The first terminal device according to claim 11, wherein the operations further comprise:

detecting, by using the sensor, second authentication information entered by the user, and sending, by using the transmitter, the second authentication information to the cloud operating system; and after authentication succeeds, accessing the first file directory.

15. A cloud server, wherein the cloud server stores a cloud operating system of a second terminal device and the cloud server comprises:

at least one processor;

a non-transitory computer-readable storage medium coupled to the at least one processor and storing computer executable program code for execution by the at least one processor;

a communications interface;

a receiver; and a transmitter, wherein:

the at least one processor, the receiver, the transmitter, the non-transitory computer-readable storage medium, and the communications interface communicate with each other by using a bus; and the at least one processor reads the program code and data that are stored in the non-transitory computer-readable storage medium, wherein the program code comprises instructions, and when the at least one processor executes the instructions, the instructions instructing the at least one processor to perform operations comprising:

receiving, by using the receiver, an authorization instruction sent by the second terminal device, and generating a first message by using the authorization instruction, wherein the first message carries first authentication information and address information of the cloud operating system;

sending, by using the transmitter, the first message to a first terminal device, wherein the first message informs the first terminal device that the second terminal device authorizes the first terminal device to share the cloud operating system of the second terminal device while the cloud operating system is being used by the second terminal device, wherein:

the first authentication information is used by the first terminal device to request authentication from the cloud operating system when the first terminal device requests to use the cloud operating system, and the address information is used by the first terminal device to establish a connection to the cloud operating system after the first terminal device has been authenticated;

receiving, by using the receiver, the first authentication information sent by the first terminal device, performing authentication on the first authentication information, and after the authentication succeeds, establishing the connection to the first terminal device;

sending, by using the transmitter, interface information to the first terminal device, wherein the interface information is used by the first terminal device to switch a currently displayed first operation interface to a second operation interface corresponding to the interface information and wherein the interface information includes icons of applications customized by a user, information about ranking relationships between the icons of the applications, and a display manner of the icons of the applications; and storing usage data that is generated when the first terminal device uses the cloud operating system in a first file directory corresponding to the first terminal device, wherein (1) the first file directory is separate from a second file directory corresponding to the second terminal device, (2) each of the first file directory and the second file directory is generated by the cloud operating system and is stored in the cloud server, (3) usage data in the second file directory is accessible by the second device and is inaccessible by the first terminal device, and (4) the usage data in the first file directory is accessible by the first device and is inaccessible by the second terminal device.

16. The cloud server according to claim 15, wherein the file directory is generated by the cloud operation system after the first terminal device has been authenticated by the at least one processor.

17. The cloud server according to claim 16, wherein the operations further comprise:

receiving, by using the receiver, an operation instruction sent by the first terminal device, wherein the operation instruction is a first input of a user on a first application icon on the second operation interface;

performing an operation corresponding to the operation instruction, and storing operation data generated by the operation in the first file directory; and sending, by using the transmitter, an operation interface corresponding to the first application icon to the first terminal device.

18. The cloud server according to claim 15, wherein the second operation interface is an operation interface that comprises at least one application icon included in the interface information.

19. The cloud server according to claim 15, wherein when the interface information comprises entry information corresponding to the cloud operating system, the second operation interface is an operation interface corresponding to the cloud operating system.

\* \* \* \* \*